United States Patent Office 2,779,939
Patented Jan. 29, 1957

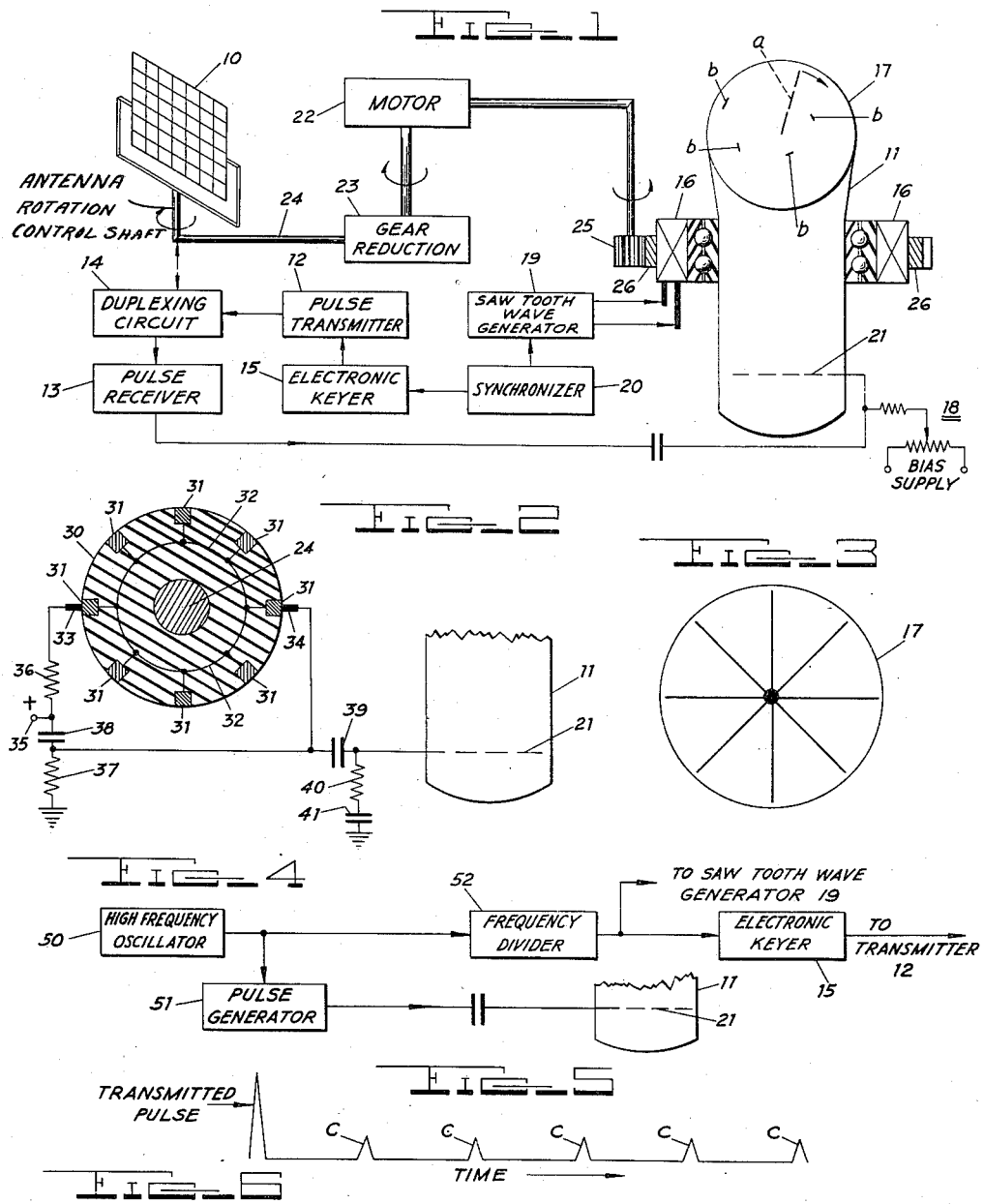

2,779,939

INDICATING SYSTEMS

Robert M. Page, Washington, D. C.

Application May 7, 1942, Serial No. 442,097

18 Claims. (Cl. 343—11)

(Granted under Title 35, U. S. Code (1952), sec. 266)

This invention relates to indicating systems and more particularly to methods and means for facilitating the interpretation of indications produced by radio echo ranging devices or similar apparatuses.

Certain radio echo ranging apparatuses include means for detecting the presence of all remote objects included within a field extending 360° about the apparatus, means for determining the range and direction of the detected objects with respect to the apparatus, and suitable indicating means, such as a cathode ray oscillograph, for providing a visual plan representation of the area extending 360° about the apparatus upon which indications of the detected remote objects are produced in such a manner to simultaneously show range and direction thereof.

More particularly, the foregoing types of radio echo ranging apparatus include a directional beam antenna supplied with a source of energy for producing a highly directional beam of energy. The antenna is continually rotated in order to scan an area 360° about the apparatus with such directional energy whereby the energy is reflected from all objects included within the scanned area. Such apparatuses further include means for producing a radial sweep on the cathode ray oscillograph which rotates in synchronism with rotation of the directional beam antenna so that the radial sweep at all times radially propagates in a direction which corresponds to the direction of the source of energy emitted from the antenna. Means are also provided for receiving reflections of the energy from remote objects and for modulating the intensity of the sweep line on the oscillograph whenever reflected energy is received. By proper synchronization of the rate of emission of the directive energy with the rate of propagation of the radial sweep, the positions of reflected energy indications on the sweep lines are a direct measurement of range of remote objects while the angular position of the sweep line at the instant indications appear thereon represents the direction of remote objects. In operation of an apparatus of the above type, the intensity of the radial sweep is modulated so that only reflected energy indications, which appear as small arcs, the length of which varies with the range, are only visible on the oscillograph screen. With an indication of the foregoing type it becomes extremely difficult to accurately determine the range and direction of remote objects since reference indications of range and direction are not provided.

It is therefore an object of the present invention to provide novel methods and means for facilitating the interpretation of indications produced by certain radio echo ranging devices or similar apparatuses.

Another object is to provide a radio echo ranging apparatus having novel indicating means whereby range and direction of remote objects are quickly obtained with a high degree of accuracy.

Another object is to provide a novel device for producing radial calibrating lines on the screen of the oscillograph associated with radio echo ranging apparatus for facilitating the determination of direction of detected objects.

Still another object of the invention is to provide a novel device for producing a series of concentric calibrating circles on the oscillograph screen which correspond to various ranges about the apparatus.

Other objects and features of the invention will appear more fully from the following detailed description when considered in connection with the accompanying drawing which discloses several embodiments of the invention. It is to be expressly understood, however, that the drawing is designed for purposes of illustration only and not as a definition of the limits of the invention, reference for the latter purpose being had to the appended claims.

In the drawing, wherein similar reference characters denote similar parts throughout the several views:

Fig. 1 is a diagrammatic showing of a radio echo ranging device which produces simultaneous indication of range and direction of remote objects;

Fig. 2 illustrates a device for producing radial calibrating marks on the viewing screen of the oscillograph disclosed in Fig. 1;

Fig. 3 shows application of the radial calibrating marks on the screen of the oscillograph;

Fig. 4 is a diagrammatic showing of a device for producing a plurality of concentric circular calibrating marks on the viewing screen of the oscillograph disclosed in Fig. 1;

Fig. 5 is an illustration employed for describing operation of the device disclosed in Fig. 4, and Fig. 6 illustrates the application of concentric circular calibrating marks on the viewing screen of the oscillograph.

With reference more particularly to Fig. 1, a radio echo ranging apparatus is disclosed therein including a rotatable directional beam antenna 10, a cathode ray oscillograph 11, radio frequency pulse transmitter 12 and a radio frequency pulse receiver 13. Transmitter 12 and receiver 13 are connected to antenna 10 through duplexing circuit 14. The duplexing circuit automatically functions to form an individual connection between transmitter 12 and antenna 10 and between the antenna and receiver 13 so that a single antenna may be employed for transmission as well as reception. A duplexing circuit constructed in accordance with the principles disclosed in the application of Leo C. Young and Robert M. Page for Impedance Coupling and Decoupling System, Serial No. 326,640, filed March 29, 1940, now Patent No. 2,688,746, dated September 7, 1954, adequately serves this purpose. Antenna 10 may take the form of any directional beam antenna capable of producing a highly directive beam of energy, while transmitter 12 and receiver 13 are constructed in such a manner to properly transmit and receive radio pulses, the types of transmitters and receivers employed in conventional television systems are suitable for these purposes. Operation of transmitter 12 is controlled by electronic keyer 15 in such a manner that equally spaced radio pulses are emitted therefrom at a predetermined rate. Oscillograph 11 is provided with electromagnetic deflection coils 16 mounted on anti-friction bearings for rotation about the oscillograph. Deflection coils 16 are wound in such a manner to produce varying magnetic lines of force within the oscillograph, when saw-tooth varying current is applied thereto, with a source of directly current, for deflecting the beam of electrons generated within the oscillograph in a radial direction from the center of the oscillograph, upon application of each saw-tooth wave form. Such deflection of the electron beam produces a radial sweep or trace *a* on viewing screen 17 of oscillograph 11. By proper adjustment of bias supply 18 the intensity of the electron beam is normally modulated so that the radial sweep $a$ is not visible. Saw-tooth wave generator 19 is provided for applying saw-tooth wave forms as well as a source of direct current to deflection coils 16 through suitable slip rings. Synchronizer 20 is employed with connections to electronic keyer 15 and saw-tooth wave generator 19, in order to properly synchronize the pulses emitted from transmitter 12 with the application of saw-tooth wave forms to deflection coils 16. Antenna 10 is continually rotated by means of motor 22, the latter being rotatably connected to the antenna through gear reduction means 23 and shaft 24. In order to rotate the radial sweep $a$ in synchronism with rotation of antenna 10, deflection coils 16 are rotated by motor 22, through pinion 25, and annular gear 26 mounted on the outer periphery of the deflection coils. The arrangement is such that the energy emission from antenna 10 and the radial propagation of the electrical beam are at all times in the same direction. Whenever radio pulses emitted from antenna 10 impinge upon remote objects, echo pulses are reflected from the objects, passed to receiver 13 wherein such echo pulses are suitably amplified and subsequently applied to intensity control grid 21 to modulate the intensity of the electron beam to produce a visual indication on screen 17.

In operation of the radio echo ranging apparatus disclosed in Fig. 1, motor 22 continually rotates antenna 10 and deflection coils 16 in synchronism. The highly directive beam of energy from antenna 10, which comprises radio pulses propagating at a constant rate, is thus continually scanned over an area extending 360° about the antenna. The application of saw-tooth varying current from generator 19 to deflection coil 16 produces a radial sweep line $a$ on viewing screen 17, of oscillograph 11, which rotates in synchronism with rotation of the directive beam of energy emitted from the antenna. Synchronizer 20 controls operation of electronic keyer 15 and saw-tooth wave generator 19 in such a manner that a radio pulse is emitted from transmitter 12 simultaneously with application of every saw-tooth wave form to deflection coils 16. Whenever radio pulses emitted from the antenna impinge upon remote objects, echo pulses are reflected from the objects, received at antenna 10 and passed through a channel of duplexing circuit 14 to a receiver 13. The echo pulses are properly amplified by receiver 13 and applied to intensity control grid 21 of the oscillograph to modulate the intensity of the electron beam thereof thus producing an indication on oscillograph screen 17. Due to operation of synchronizer 20, such pulse indications appear at various distances from the center of the oscillograph screen 17 in direct proportion to the range of remote objects, from which echo pulses are reflected, with respect to antenna 10. Since antenna 10 and sweep line $a$ rotate in synchronism, echo pulse indications of remote objects appear on oscillograph 17 at various angular positions thereon that correspond to the angular position of remote objects from which echo pulses are reflected, with respect to antenna 10.

The foregoing type of radio echo ranging apparatus thus provides a visible plan indication of the area continually scanned by the highly directive source of energy emitted from antenna 10, which, in the present instant, comprises the viewing screen of the oscillograph. Indications of remote objects are produced on viewing screen 17 in such a manner that range and direction, of all remote objects included within the field scanned by the directive beam of energy from the antenna, are simultaneously shown. In Fig. 1, indications of remote objects designated by $b$, are shown on viewing screen 17, at various radial distances from the center of the oscillograph screen and at different angular positions thereon. Indications $b$ represent positions of remote objects with respect to antenna 10; the angular positions of the indications, with respect to the center of viewing screen 17, represent directions of such remote objects with respect to antenna 10, while the radial distance of the indications from the center of screen 17 correspond to the range of remote objects with respect to the antenna. As mentioned heretofore, bias supply 19 is adjusted in such a manner to modulate the intensity of the electron beam of oscillograph 11 so that sweep line $a$ is not visible; therefore, remote object indications $b$ are only visible on screen 17.

As mentioned heretofore, one of the objects of the present invention is to provide novel means for facilitating the interpretation of indications produced by radio echo ranging devices, such as a type of apparatus disclosed in Fig. 1. In Fig. 2 of the drawings, a novel device is disclosed for producing a series of radial calibrating lines on screen 17 whereby the direction of remote objects may be more readily determined from the indications thereof produced on the screen. The device is constructed in such a manner to produce any desired number of radial calibrating lines on the viewing screen at any desired angular relation therebetween. As shown, the foregoing device comprises a cylindrical member 30, constructed of insulating material, mounted on shaft 24 for synchronous rotation with antenna 10. A plurality of metallic conductors 31 are imbedded in the outer periphery of member 30 at equally spaced intervals. As will appear more fully from the following description, the number of conductors 31 determines the number of radial calibrating lines produced on viewing screen 17, and it is to be expressly understood that any desired number of metallic conductors 31 may be employed. Metallic conductors 31 are electrically interconnected through circular conductor 32. The device further includes stationary contact members 33 and 34 positioned 180° with respect to each other about the periphery of member 30. The arrangement is such, upon rotation of shaft 24, that metallic conductors 31 successively pass stationary contacts 33 and 34, with contact members 33 and 34 simultaneously electrically contacting a pair of metallic conductors 31. An electrical circuit is thus completed between stationary contact members 33 and 34, through a pair of metallic conductors 31 and circular conductor 32, a number of times for each complete revolution of shaft 24 that is equal to the number of metallic conductors 31. Stationary contact member 33 is maintained at high potential from a source of high potential applied at point 35, through resistor 36, while stationary contact 34 is normally maintained at ground potential through resistor 37. Condenser 38 is positioned between stationary contacts 33 and 34 and is charged with high potential from point 35 when electrical contact is not provided between stationary contacts 33 and 34. The low potential terminal of condenser 38 is connected through condenser 39 to intensity control grid 21, while the low potential terminal of condenser 39 is connected to ground potential through resistor 40 and condenser 41. When member 30 is in a certain angular position with respect to stationary contact members 33 and 34 so that metallic conductors 31 are not in electrical contact therewith, a high potential charge is applied to condenser 38 from point 35. When shaft 24 rotates to simultaneously move a pair of metallic conductors 31 into an electrical contact with stationary contact members 33 and 34, condenser 38 is discharged, thus applying a positive pulse through condenser 39 to grid 21 of the oscillograph. When the electrical connection between stationary contacts 33 and 34 is terminated, upon further rotation of shaft 24, condenser 38 is again charged with positive potential from point 35. It is to be expressly understood, therefore, that a positive pulse is applied to grid 21 whenever contact members 33 and 34 simultaneously electrically contact a pair of metallic conductors 31. The periodic application of positive pulses to intensity control grid 21 modulates the intensity of sweep line $a$ to render the same visible at various angular positions.

In Fig. 3 of the drawings, viewing screen 17 of oscillograph 11 is disclosed with the radial calibrating lines produced thereon upon operation of the device disclosed in Fig. 2. The radial lines correspond to the number of metallic conductors 31 provided on member 30, and are angularly positioned with respect to each other in the same manner that metallic members 31 are angularly positioned about the periphery of member 30. It is to be expressly understood that any desired number of radial calibrating lines may be provided by increasing the number of metallic conductors 31. The radial calibrating lines shown in Fig. 3 greatly facilitate the determination of direction of remote objects from remote object indications *b*, as shown in Fig. 1. As mentioned heretofore, the number of radial calibrated lines may be increased to thus decrease the angular spacing therebetween to further facilitate determination of direction of remote objects with a high degree of accuracy.

A device for producing a series of equally spaced concentric circular calibrating lines on viewing screen 17 is disclosed in Fig. 4 of the drawings. In this arrangement, concentric circles, corresponding to predetermined range values, are produced on viewing screen 17 in order to facilitate determination of range of remote objects. As shown, the device includes a high frequency oscillator 50 which feeds to a conventional pulse generator 51 that produces positive pulses at a frequency controlled by the oscillator 50. The positive pulses are applied to intensity control grid 21 of oscillograph 11 to periodically modulate the intensity of the electron beam of the oscillograph. The output of oscillator 50 is also fed to a suitable frequency divider 52 which operates to reduce the frequency of the signal to a certain ratio less than the frequency of oscillator 50. The output frequency divider 52 is applied to saw-tooth wave generator 19 and electronic keyer 15 so that radio pulses are emitted from transmitter 12, and sweep line *a* is produced at a frequency an integral number of times less than the frequency of oscillator 50 determined by frequency divider 52. Also, since the positive pulses from generator 51 applied to intensity control grid 21 are at a frequency equal to the frequency of oscillator 50, the positive pulses are applied to grid 21 at a rate a similar number of times greater than the rate of generation of sweep *a*.

Operation of the foregoing device may be more readily understood with reference to Fig. 5 which discloses propagation of sweep line *a*. Since the output of frequency divider 52 initiates propagation of sweep line *a* and simultaneously triggers transmitter 12, an indication of the transmitted pulse is produced on the sweep line at substantially the same instant the latter originates, as shown in the figure. Since pulse generator 51 is operating at a frequency a number of times greater than the frequency of the output of frequency divider 52 an equal number of positive pulses are applied to grid 21 during propagation of each sweep line *a*. Such pulses are produced on the sweep line at equal intervals as shown by pulse indication *c* in Fig. 5. In the instant arrangement, positive pulses are applied to grid 21 at a rate five times greater than the rate of propagation of sweep *a*. The distance between each pulse indication *c* on the sweep line is thus equal to one fifth the range which the sweep line is calibrated. In Fig. 6 of the drawings the viewing screen 17 of oscillograph 11 is disclosed with a series of equally spaced concentric circular calibrating marks thereon which are produced upon operation of the device disclosed in Fig. 4, when motor 22 is rotating at a sufficient speed to produce persistent indications on screen 17. When motor 22 is operating at a lower rate of speed, the concentric circular calibrating marks appear visible over a certain arc which moves in synchronism with rotation of the antenna. Fig. 6 also discloses the visible radial calibrating lines shown in Fig. 3 in order to illustrate the simultaneous utilization of radial calibrating lines and concentric calibrating circles for simultaneously facilitating determination of range and direction of remote objects.

There is thus provided by the present invention novel means for facilitating the interpretation of indications produced by radio echo ranging devices or similar apparatuses of the type described herein. Such means produces visual radial marks on the viewing screen of the apparatus which are calibrated as a function of direction, as well as producing a series of visual concentric circular marks on the viewing screen which are calibrated as a function of range. The radial or circular calibrating marks are produced in such a manner that the same may be individually or simultaneously produced on the indicator and the same function to greatly assist in determination of range and direction of remote objects from indications thereof produced on the indicator.

Although several embodiments of the present invention have been disclosed and described herein, it is to be expressly understood that various changes and substitutions may be made therein without departing from the spirit of the invention as well understood by those skilled in the art. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. An apparatus for indicating positions of remote objects comprising means producing a directional energy emission, means rotating said directional energy emission for continually scanning an area about the apparatus, means receiving energy reflections whenever said directional energy emission impinges upon and reflects from a remote object included within said scanned area, means producing a visual plan representation of said scanned area, means responsive to reception of said reflected energy for producing visual indication on said plan representation of each remote object included in said area at a linear position and at an angular position with respect to a reference direction of said representation respectively in accordance with range and direction of each remote object with respect to the apparatus, and means producing radial calibrating marks on said representation for facilitating determination of directions of remote objects from said indications.

2. An apparatus for indicating positions of remote objects comprising means producing a directional energy emission, means rotating said directional energy emission for continually scanning an area about the apparatus, means receiving energy reflections whenever said directional energy emission impinges upon and reflects from a remote object included within said scanned area, means producing a visual plan representation of said scanned area, means responsive to reception of said reflected energy for producing visual indication on said plan representation of each remote object included in said area at a radial distance and at an angular position with respect to a reference point on said representation respectively in accordance with range and direction of each remote object with respect to the apparatus, and means producing calibrated concentric circular marks on said representation for facilitating determination of range of remote objects from said indications.

3. An apparatus for indicating positions of remote objects comprising means producing a directional energy emission, means rotating said directional energy emission for continually scanning an area about the apparatus, means receiving energy reflections whenever said directional energy emission impinges upon and reflects from a remote object included within said scanned area, means producing a visual plan representation of said scanned area, means responsive to reception of said reflected energy for producing visual indication on said plan representation of each remote object included in said area at a radial distance and at an angular position with respect to a reference point on said representation respectively in accordance with range and direction of each remote object with respect to the apparatus, means producing radial calibrating marks on said representation for facilitating determination of remote objects, and means producing concentric circular marks on said representation for facilitating determination of range of remote objects.

4. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included within said scanned area, a cathode ray indicator, means continually deflecting the electron beam of said indicator whereby said beam continually radially scans the viewing screen of said indicator in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, and means producing radial calibrating marks on said screen for facilitating determination of direction of remote objects.

5. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included within said scanned area, a cathode ray indicator, means continually deflecting the electron beam of said indicator whereby said beam continually radially scans the viewing screen of said indicator in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, and means producing calibrated concentric circular marks on said screen for facilitating determination of range of remote objects.

6. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included within said scanned area, a cathode ray indicator, means continually deflecting the electron beam of said indicator whereby said beam continually radially scans the viewing screen of said indicator in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, means producing radial calibrating marks on said screen for facilitating determination of direction of remote objects, and means producing concentric calibrating circular marks on said screen for facilitating determination of range of remote objects.

7. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included within said scanned area, a cathode ray indicator, means continually deflecting the electron beam of said indicator whereby said beam continually radially scans the viewing screen of said indicator in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, and means rotating in synchronism with said antenna for modulating the intensity of said electron beam during radial scanning thereof at certain angular positions during rotation thereof for producing radial direction calibrating marks on said screen.

8. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included with said scanned area, a cathode ray indicator, means continually deflecting the electron beam of said indicator whereby said beam continually radially scans the viewing screen of said indicator in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, means responsive to rotation of said antenna for modulating the intensity of said electron beam during radial scanning thereof when the antenna occupies certain angular positions during rotation thereof whereby radial direction calibrating marks are produced on said screen.

9. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included within said scanned area, a cathode ray indicator, means continually deflecting the electron beam of said indicator whereby said beam continually radially scans the viewing screen of said indicator in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, and means intermittently modulating the intensity of said electron beam at equally spaced time intervals during radial scanning thereof for producing concentric circular range calibrating marks on said screen.

10. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included within said scanned area, a cathode ray indicator, means continually deflecting the electron beam of said indicator whereby said beam continually radially scans the viewing screen of said indicator in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, means responsive to rotation of said antenna for modulating the intensity of said electron means during radial scanning thereof when the antenna occupies certain angular positions during rotation thereof whereby radial direction calibrating marks are produced on said screen, and means intermittently modulating the electron beam at equally spaced time intervals during each radial scanning thereof for producing concentric circular range calibrating marks on said screen.

11. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included within said scanned area, a cathode ray indicator, means continually deflecting the electron beam of said indicator whereby said beam continually radially scans the viewing screen of said indicator in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, means generating a plurality of impulses at equally spaced intervals during each complete rotation of said antenna, and means applying said impulses to said indicator for modulating the intensity of said electron beam whereby equally spaced radial calibrating marks are produced on said screen.

12. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included within said scanned area, a cathode ray indicator, means continually deflecting the electron beam of said indicator whereby said beam continually radially scans the viewing screen of said indicator in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, a condenser, means continually supplying a source of potential to said condenser, means discharging said condenser at equally spaced intervals during each complete rotation of said antenna for producing equally spaced impulses, and means applying said impulses to said indicator for modulating the intensity of said electron beam whereby equally spaced radial calibration marks are produced on said screen.

13. An apparatus for indicating positions of remote objects in space comprising a directional beam antenna, means applying a source of energy to said antenna for producing a highly directive energy emission therefrom, means continually rotating said antenna for continually scanning an area about said apparatus with said directive energy, means receiving energy reflections whenever said directive energy impinges upon and reflects from remote objects included within said scanned area, an indicator including means generating an electron beam, means continually deflecting the said electron beam whereby said beam continually radially scans the viewing screen of said indicator in synchronism with the rate of propagation of said directive energy emission in a direction corresponding to the direction of said directive energy emission, means modulating the intensity of said electron beam in accordance with the reception of said energy reflections for producing visual indications on said screen of remote objects included within said area, with the indications having certain radial distances at certain angular positions with respect to the center of said screen respectively in accordance with the range and direction of each remote object with respect to said antenna, means producing impulses at a rate greater than the rate of generation of said directive energy emission, means applying said impulses to said indicator for intermittently modulating the intensity of said electron beam at equally spaced time intervals during each radial scanning thereof whereby a series of equally spaced concentric circular calibrating marks are produced on said screen upon complete rotation of said antenna.

14. In a radio apparatus for object locating, means for comparing the direction of an object to a reference direction comprising, a generator of ultra high frequency energy pulses, means for radiating the pulses in a directive electromagnetic beam, means for periodically scanning a field of view including the object with the beam, means for generating a directional sweep voltage dependent upon the instantaneous direction of the beam, means for receiving energy reflected from the object, indicator means for representing the reflected energy by a luminous image, means actuated by the directional sweep voltage for positioning the indicator image according to the direction of the beam when the object is scanned, and electronic means for producing a directional reference line on said indicator.

15. In a radio apparatus for object locating, means for comparing the direction of an object to a reference direction comprising, a generator of ultra high frequency energy pulses, means for radiating the pulses in a directive electromagnetic beam, means for periodically scanning a field including the object with the beam, means for generating a directional sweep voltage dependent upon the instantaneous direction of the beam, means for receiving energy reflected from the object, indicator means for representing the reflected energy by a luminous image, means actuated by the directional sweep voltage for positioning the indicator image according to the direction of the beam when the object is scanned, and means for producing a directional index on said indicator at a position corresponding to zero directional sweep voltage.

16. In a radio apparatus for object locating, means for comparing the direction of an object to a reference direction comprising a generator of ultra high frequency energy pulses, means for radiating the pulses, means for radiating the pulses in a directive electromagetic beam, means for periodically scanning a field of view including the object with the beam, means for generating a directional sweep voltage dependent upon the instantaneous direction of the beam, means for receiving energy reflected from the object, indicator means for representing the reflected energy by an image, means actuated by the directional sweep voltage for positioning the indicator image according to direction of the beam when the object is scanned, and means coordinated with said scanning means for periodically producing on said indicator at a position corresponding to a predetermined directional sweep voltage, an image representing the reference direction of said electromagnetic beam.

17. In a radio apparatus for object locating, means for comparing the direction of an object to a reference direction comprising, a generator of ultra high frequency energy pulses, means for radiating the pulses in a directive electromagnetic beam, means for periodically scanning a field of view including the object with the beam, means for generating a directional deflecting field dependent upon the instantaneous direction of the beam, means for receiving energy reflected from the object, indicator means for representing the reflected energy by a luminous image, means actuated by the directional deflecting field for positioning the indicator image according to the direction of the beam when the object is scanned, and electronic means for producing a directional reference line on said indicator.

18. In a radio apparatus for object locating, means for comparing the direction of an object to a reference direction comprising, a generator of ultra high frequency energy pulses, means for radiating the pulses in a directive electromagnetic beam, means for periodically scanning a field of view including the object with the beam, means for generating a sweep voltage, means for receiving energy reflected from the object, indicator means for representing the reflected energy by a luminous image, means utilizing the sweep voltage for positioning the indicator image according to the direction of the beam when the object is scanned, and electronic means for producing a directional reference line on said indicator.

References Cited in the file of this patent

UNITED STATES PATENTS

| | | |
|---|---|---|
| 2,121,359 | Luck et al. | June 21, 1938 |
| 2,178,074 | Jakel | Oct. 31, 1939 |
| 2,208,378 | Luck | July 16, 1940 |
| 2,231,929 | Lyman | Feb. 18, 1941 |
| 2,241,809 | De Forest | May 13, 1941 |
| 2,263,377 | Busignies | Nov. 18, 1941 |
| 2,307,237 | Rea | Jan. 5, 1943 |
| 2,312,761 | Hershberger | Mar. 2, 1943 |
| 2,313,966 | Poch | Mar. 16, 1943 |
| 2,380,929 | Ahier | Aug. 7, 1945 |
| 2,403,278 | Hershberger | July 2, 1946 |
| 2,405,238 | Seeley | Aug. 6, 1946 |
| 2,432,196 | Hershberger | Dec. 9, 1947 |
| 2,468,032 | Busignies | Apr. 26, 1949 |
| 2,471,516 | Bryant | May 31, 1949 |

FOREIGN PATENTS

| | | |
|---|---|---|
| 497,147 | Great Britain | Dec. 9, 1938 |